United States Patent
Zhu et al.

(10) Patent No.: US 8,005,026 B2
(45) Date of Patent: Aug. 23, 2011

(54) MULTIPLE RADIO PLATFORM TRANSMISSION POWER CONTROL

(75) Inventors: Jing Zhu, Hillsboro, OR (US);
Hsin-Yuo Liu, San Jose, CA (US);
Leora Roth, Raanana (IL)

(73) Assignee: Intel Corporation, Santa Clara, CA (US)

( * ) Notice: Subject to any disclaimer, the term of this patent is extended or adjusted under 35 U.S.C. 154(b) by 1089 days.

(21) Appl. No.: 11/824,316

(22) Filed: Jun. 29, 2007

(65) Prior Publication Data

US 2009/0003294 A1    Jan. 1, 2009

(51) Int. Cl.
*H04B 7/005* (2006.01)
*H04Q 7/00* (2006.01)
(52) U.S. Cl. .......................... 370/278; 370/328
(58) Field of Classification Search .................. 370/278, 370/280, 294, 328, 338, 401
See application file for complete search history.

(56) References Cited

U.S. PATENT DOCUMENTS

| | | | |
|---|---|---|---|
| 6,459,901 B1* | 10/2002 | Chawla et al. | 455/450 |
| 6,690,944 B1* | 2/2004 | Lee et al. | 455/522 |
| 7,349,504 B2* | 3/2008 | Li et al. | 375/346 |
| 7,729,329 B2* | 6/2010 | Fujita et al. | 370/342 |
| 7,782,825 B2* | 8/2010 | Yang et al. | 370/338 |
| 2002/0018516 A1* | 2/2002 | Mizuguchi | 375/130 |
| 2004/0048572 A1* | 3/2004 | Godfrey | 455/41.2 |
| 2004/0058700 A1* | 3/2004 | Nilsson et al. | 455/522 |
| 2007/0197251 A1* | 8/2007 | Das et al. | 455/522 |

* cited by examiner

*Primary Examiner* — Hong Cho
(74) *Attorney, Agent, or Firm* — Ryder, Lu, Mazzeo and Konieczny, LLC; Douglas J. Ryder

(57) ABSTRACT

In general, in one aspect, the disclosure describes an apparatus that includes a first radio to communicate with a first wireless network and a second radio to communicate with a second wireless network. A controller is used to estimate signal to noise and interference ratio (SINR) for signal being received by the first radio when the second radio is transmitting. The controller is also to determine if the estimate meets a threshold. Transmissions are permitted from the second radio while the first radio is receiving if the threshold is met.

20 Claims, 4 Drawing Sheets

MULTIPLE RADIO PLATFORM TRANSMISSION POWER CONTROL

BACKGROUND

The desire for wireless communications continues to increase and accordingly the number and type of wireless networks (e.g., wireless local area network (WLAN), wireless metropolitan area networks (WMAN), wireless personal area networks (WPAN)) available for wireless communications continues to increase. In order for mobile devices (e.g., laptop computers, handheld devices) to provide wireless communications there is a need for the devices to accommodate several different wireless network types (network models). In order to support multiple wireless networks, the mobile devices may include a cluster of different radios for communicating over the various network types (referred to as the Multi-Radio coexistence Platforms (MRP)).

The various radios may operate in overlapping or adjacent frequency bands and possibly suffer from interference when they operate at overlapping time instants due to, for example, physical proximity and radio power leakage.

BRIEF DESCRIPTION OF THE DRAWINGS

The features and advantages of the various embodiments will become apparent from the following detailed description in which.

DETAILED DESCRIPTION

A Multi-Radio coexistence Platform (MRP) mobile device, such as a cellular phone, may include multiple wireless interfaces for communicating with multiple different wireless networks. For example, the MRP may include some combination of wireless local area network (WLAN) radio, wireless metropolitan area network (WMAN) radio, and wireless personal area network (WPAN) radio. The close proximity of the different radios may result in cross radio interference between them when one is transmitting and the other is receiving.

Figure 1:
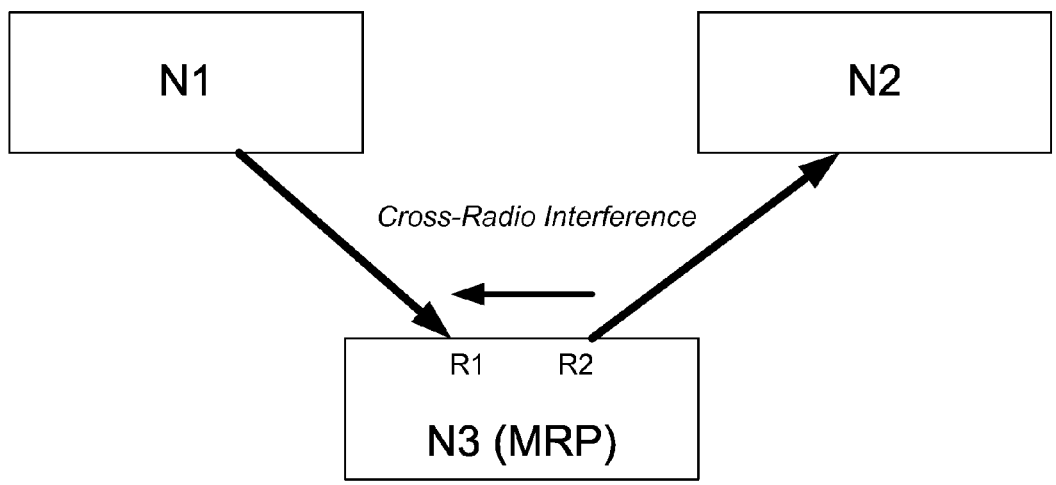
FIG. 1 illustrates an example high level system diagram for concurrent operations of a Multi-Radio coexistence Platform (MRP), according to one embodiment.

FIG. 1 illustrates an example high level system diagram for concurrent operations of a MRP. The system includes three nodes (N1, N2, N3) where N1 and N2 are different wireless networks and N3 is the MRP. The MRP includes two radios (R1, R2) where R1 is for communicating with N1 and R2 is for communicating with N2. The concurrent operations illustrated at the MRP are the receipt of data from N1 at R1 and the transmission of data from R2 to N2. The close proximity of R1 and R2 may result in cross-radio interference on the reception at R1 due to transmission from R2. The outcome is the decrease of received signal to noise and interference ratio of R1 ($SINR_{R1}$).

The $SINR_{R1}$ is determined as the received signal strength ($S_{R1}$) divided by the sum of the received cross-radio interference ($I_{R1}$) and background noise power (N), such that $SINR_{R1}=S_{R1}/(I_{R1}+No)$. The $S_{R1}$ is a function of the transmission power of N1 ($P_{N1}$) and $I_{R1}$ is a function of the transmission power of R2 ($P_{R2}$), while No can be regarded as constant.

The $SINR_{R1}$ may be maintained at an acceptable level by avoiding R2 transmitting data while R1 is receiving data (operating in a time division multiplex (TDM) mode) so as to avoid $I_{R1}$. Another way to maintain the $SINR_{R1}$ when R1 is receiving and R2 is transmitting at the same time (operating in a concurrent multiplex (CM) mode) is to utilize a controller to modify the transmission power control (TPC) to increase $S_{R1}$ and/or decrease $I_{R1}$. $S_{R1}$ may be increased by increasing $P_{N1}$ and $I_{R1}$ may be decreased by decreasing $P_{R2}$.

The TPC (strength of the signals being received by (transmitted to) and transmitted from the MRP) may be based on link budget considering path loss, multi-path fading, and background noise. Accordingly, the change in strength of the signals to accommodate the CM mode may be limited.

The MRP may typically operate in TDM mode. In order to determine if the MRP can enter a CM mode the controller may estimate the $S_{R1}$ and $I_{R1}$ to determine if the $SINR_{R1}$ is at or above a target SINR (So). If the $SINR_{R1}$ is less than So the controller may increase $P_{N1}$ and/or decrease $P_{R2}$ (modify the TPC). The change in $P_{N1}$ and/or $P_{R2}$ may be based on any number of parameters (e.g., wireless standard associated with the radio, link budget). Once the TPC is modified another estimation of $S_{R1}$ and $I_{R1}$ may be made. The process may continue until a determination is made that the $SINR_{R1}$ is at or above So at which point the MRP can enter SM mode, or until a determination is made that no more TPC changes can be made.

Figure 2:
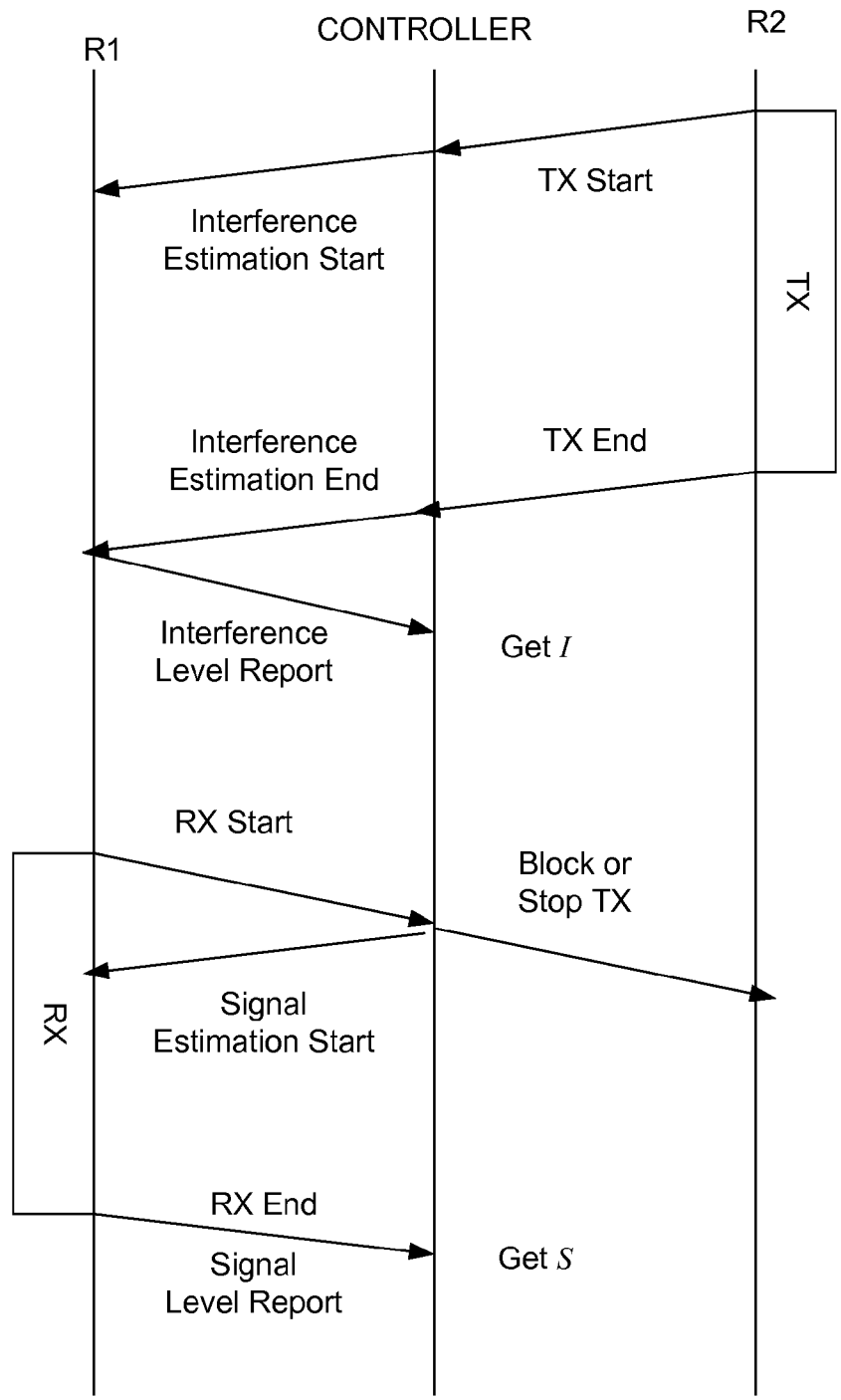
FIG. 2 illustrates an example message exchange between radios and controller on the MRP in an estimation phase, according to one embodiment.

FIG. 2 illustrates an example message exchange between radios and controller on the MRP in an estimation phase. When R2 starts transmitting data the controller receives a transmission started message from R2 at which point the controller sends a message to R1 to begin estimating interference. When R2 stops transmitting data the controller receives a transmission end message from R2 at which point the controller sends a message to R1 to stop estimating interference. R1 then sends the estimated interference (interference level report) to the controller.

When R1 starts receiving data the controller receives a receiving started message from R1. The controller then sends a message to R2 to instruct R2 to stop transmitting data, as well as a message to R1 to start estimating the signal When R1 stops receiving data it sends the signal estimation (signal level report) to the controller.

Figure 3:
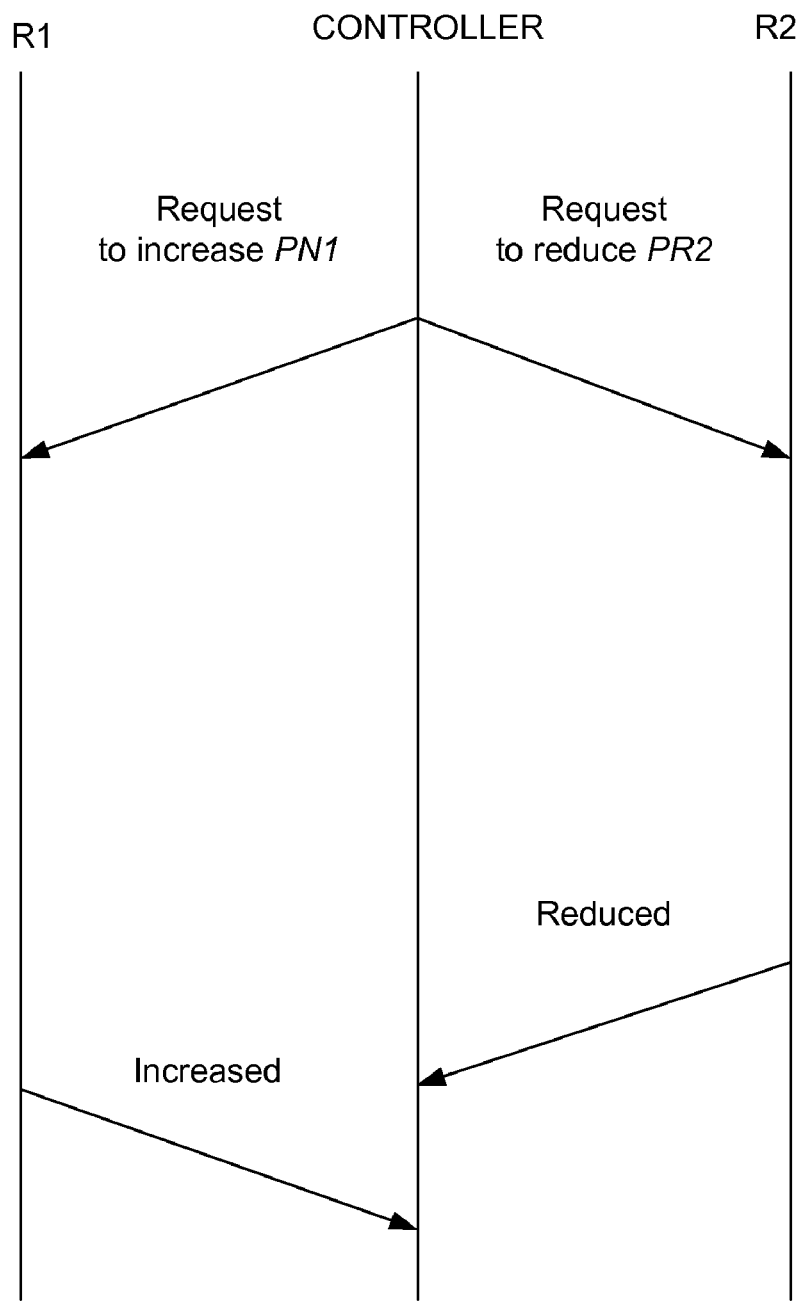
FIG. 3 illustrates an example message exchange between radios and controller on the MRP in a power control phase, according to one embodiment.

FIG. 3 illustrates an example message exchange between radios and controller on the MRP in a power control phase. When the controller determines that the So has not been met it can send an request to increase $P_{N1}$ to R1 and/or a request to decrease $P_{R2}$ to R2. Once $P_{N1}$ has been increased R1 sends a message to the controller that the power was increased. Once $P_{R2}$ has been decreased R2 sends a message to the controller that the power was decreased. As illustrated the increase message from R1 is received after the decrease message from R2 because in order to increase $P_{N1}$ R1 needs to send a request to N1 and then N1 needs to increase the power before R1 can notify the controller that the increase has occurred. The increase and decrease messages to the controller may simply be a confirmation message that an increase/decrease occurred or may include the new power levels.

Figure 4:
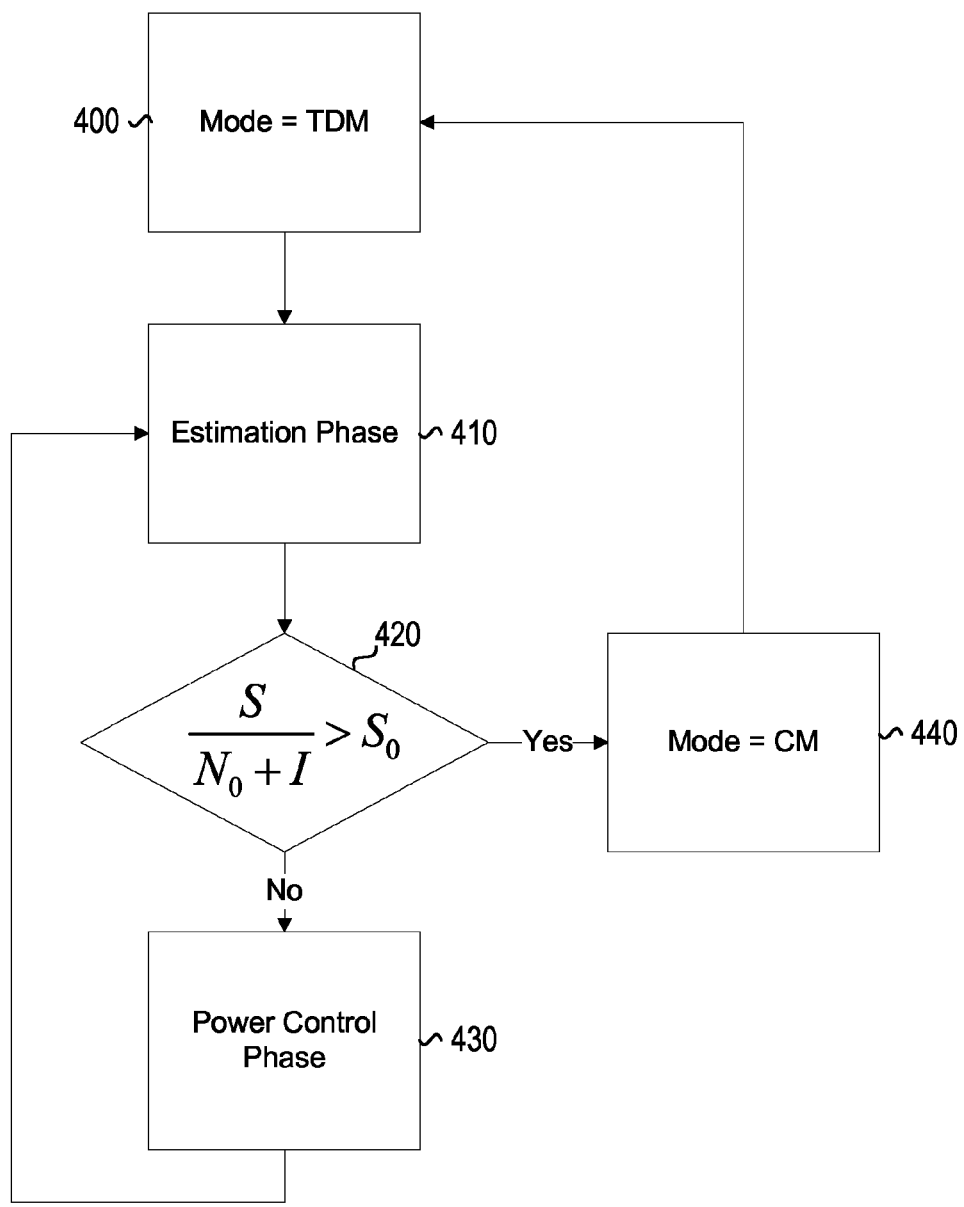
FIG. 4 illustrates an example flow control diagram for determining when a MRP can enter concurrent multiplex (CM) mode, according to one embodiment.

FIG. 4 illustrates an example flow control diagram for determining when a MRP can enter CM mode. The process begins with the MRP in TDM mode 400. The MRP enters an estimation phase 410 to estimate the interference and signal strength at R1. The MRP may be in estimation mode 410 all the time, or may enter at certain intervals, based upon certain parameters, or when directed to. A comparison of the estimated $SINR_{R1}$ to So is made 420. The comparison may be performed each time an estimate is made, at certain intervals, based upon certain parameters, or when directed to. If the determination is that $SINR_{R1}$ is less than So (420 No) the MRP enters the power control phase 430 to request modifications to TPC (increase $P_{N1}$ and/or decrease $P_{R2}$). Once the adjustments are made (or a determination that the modifications can't be made) the process returns to the estimation phase 410. If the determination is that $SINR_{R1}$ is greater than So (420 Yes) the MRP may enter CM mode 440 and allow transmissions from R2 at the same time that R1 is receiving. In order to ensure the $SINR_{R1}$ remains at an acceptable level the MRP may only remain in the CM mode 440 for a certain period of time at which point it will return to the TDM mode 410.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. An apparatus comprising:
a first radio to communicate with a first wireless network;
a second radio to communicate with a second wireless network, wherein the second wireless network is a different type of network than the first wireless network; and
a controller to
schedule transmissions from the second radio and receptions by the first radio at different times,
estimate signal to noise and interference ratio (SINR) for data received by the first radio when the second radio is transmitting,
determine if the SINR estimate meets a threshold, and
permit transmissions from the second radio while the first radio is receiving if the threshold is met.

2. The apparatus of claim 1, wherein the controller is further to permit transmissions from the second radio while the first radio is receiving for a defined period.

3. The apparatus of claim 1, wherein the controller is further to request an increase in transmission power from a node transmitting data to the first radio if the threshold is not met.

4. The apparatus of claim 1, wherein the controller is further to request a decrease in transmission power from the second radio if the threshold is not met.

5. The apparatus of claim 1, wherein the controller is further to request modifications to transmission power control (TPC).

6. The apparatus of claim 5, wherein the controller is further to re-estimate SINR for the data received by the first radio after the TPC modifications are made.

7. The apparatus of claim 6, wherein the TPC modifications are limited by link budget.

8. The apparatus of claim 1, wherein the controller is further to block transmissions from the second radio while the first radio is receiving if the threshold is not met.

9. The apparatus of claim 1, wherein the controller is further to instruct the first radio to estimate interference while the second radio is transmitting.

10. The apparatus of claim 1, wherein the controller is further to instruct the first radio to estimate signal strength while the first radio is receiving.

11. A method comprising:
operating a Multi-Radio coexistence Platform (MRP) in a time division multiplex (TDM) mode where transmissions from a first radio on the MRP are scheduled at different times than receptions by a second radio on the MRP, wherein the first radio communicates with a first wireless network and the second radio communicates with a second wireless network;
estimating signal to noise and interference ratio (SINR) for data received on the second radio while the MRP is in the TDM mode;
comparing the estimated SINR to a threshold while the MRP is in the TDM mode;
modifying transmission power control (TPC) of the MRP in the TDM mode if the threshold is not met; and
switching to a continuous multiplex (CM) mode if the threshold is met, wherein the CM mode permits transmissions from the first radio at same time as receptions by the second radio.

12. The method of claim 11, wherein the switching to the CM mode is for a defined period.

13. The method of claim 11, wherein the estimating SINR includes estimating interference on the second radio while the first radio is transmitting and estimating signal strength of the second radio while the second radio is receiving.

14. The method of claim 11, wherein the modifying TPC includes increasing transmission power from a node transmitting data to the second radio and decreasing transmission power from the first radio.

15. A multi-radio mobile device comprising:
a first radio to communicate with a first wireless network;
a second radio to communicate with a second wireless network, wherein the second wireless network is a different type of network than the first wireless network; and
a controller to
operate the device in a time division multiplex (TDM) mode where transmissions from the second radio and receptions by the first radio are scheduled at different times,
estimate signal to noise and interference ratio (SINR) for data received by the first radio when the second radio is transmitting,
determine if the SINR estimate meets a threshold, and
switch to a continuous multiplex (CM) mode if the threshold is met, wherein the CM mode permits transmissions from the second radio at same time as receptions by the first radio.

16. The device of claim 15, wherein the controller is further to modify transmission power control (TPC) of the device if the threshold is not met.

17. The device of claim 15, wherein the controller is further to re-estimate SINR after the TPC modifications.

18. The device of claim 15, wherein the controller is further to request an increase in transmission power from a node transmitting data to the first radio if the threshold is not met.

19. The device of claim 15, wherein the controller is further to request a decrease in transmission power from the second radio if the threshold is not met.

20. The device of claim 15, wherein the controller is to estimate SINR by estimating interference on the first radio while the second radio is transmitting and estimating signal strength of the first radio while the first radio is receiving.

* * * * *